US012200417B2

(12) United States Patent
Mao et al.

(10) Patent No.: US 12,200,417 B2
(45) Date of Patent: Jan. 14, 2025

(54) LOUDSPEAKER MESH COVER AND LIGHT-EMITTING LOUDSPEAKER HAVING SAME

(71) Applicant: DAKANG HOLDING CO., LTD., Zhejiang (CN)

(72) Inventors: Rujia Mao, Zhejiang (CN); Xiaoyu He, Zhejiang (CN); Guofei Yuan, Zhejiang (CN)

(73) Assignee: DAKANG HOLDING CO., LTD., Zhejiang (CN)

( * ) Notice: Subject to any disclaimer, the term of this patent is extended or adjusted under 35 U.S.C. 154(b) by 238 days.

(21) Appl. No.: 17/800,535

(22) PCT Filed: Feb. 20, 2020

(86) PCT No.: PCT/CN2020/075981

§ 371 (c)(1),
(2) Date: Aug. 18, 2022

(87) PCT Pub. No.: WO2021/138969

PCT Pub. Date: Jul. 15, 2021

(65) Prior Publication Data

US 2023/0105804 A1 Apr. 6, 2023

(30) Foreign Application Priority Data

Jan. 10, 2020 (CN) ........................ 202020051248.1

(51) Int. Cl.
*H04R 1/02* (2006.01)
*F21V 33/00* (2006.01)

(52) U.S. Cl.
CPC ......... *H04R 1/028* (2013.01); *F21V 33/0056* (2013.01); *H04R 1/023* (2013.01); *F21V 2200/00* (2015.01)

(58) Field of Classification Search
CPC .... H04R 1/028; H04R 1/023; H04R 2499/15; H04R 5/02; H04R 1/345; H04R 2307/025;
(Continued)

(56) References Cited

U.S. PATENT DOCUMENTS

2003/0048912 A1* 3/2003 Reich ....................... H04R 1/02 381/124
2015/0124441 A1 5/2015 Lam et al.
(Continued)

FOREIGN PATENT DOCUMENTS

CN 204244448 4/2015
CN 207321542 5/2018
(Continued)

OTHER PUBLICATIONS

"International Search Report (Form PCT/ISA/210) of PCT/CN2020/075981", mailed on Oct. 10, 2020, with English translation thereof, pp. 1-5.
(Continued)

*Primary Examiner* — Lun-See Lao
(74) *Attorney, Agent, or Firm* — JCIPRNET

(57) ABSTRACT

A loudspeaker mesh cover and a light-emitting loudspeaker having same are provided, the loudspeaker mesh cover is installed outside a loudspeaker, so as to play a certain protective role on the loudspeaker, enrich the light-emitting way and save the internal space of the loudspeaker. In addition, a light-emitting member is more convenient to disassemble in relative to a way of fixing a light-emitting assembly inside the loudspeaker. The loudspeaker mesh cover provided by the present disclosure may transform non-light-emitting loudspeakers on the market into light-emitting loudspeakers, so as to meet the demands of consumers for loudspeakers.

18 Claims, 5 Drawing Sheets

(58) Field of Classification Search
CPC .......... H04R 2307/204; H04R 2499/11; H04R 7/125; H04R 1/02; H04R 1/025; H04R 3/12; H04R 7/122; H04R 1/026; H04M 2250/12; H04M 1/0266; H04M 1/035; H04M 3/5116; H10K 59/40; H10K 77/111; H10K 2102/311; H10K 50/854; H10K 50/858; H10K 59/12; H10K 59/50; H10K 59/65; H04N 23/60; H04N 23/62; H04N 23/661; H04W 88/02; H04W 84/18
USPC .................................................. 381/332, 322
See application file for complete search history.

(56) References Cited

U.S. PATENT DOCUMENTS

| | | | | |
|---|---|---|---|---|
| 2016/0345447 | A1* | 11/2016 | Kraz | G08B 17/113 |
| 2020/0124270 | A1* | 4/2020 | Spencer | F16M 13/027 |

FOREIGN PATENT DOCUMENTS

| | | | | |
|---|---|---|---|---|
| CN | 207427381 | | 5/2018 | |
| CN | 209593752 | * | 11/2019 | H04R 9/06 |
| CN | 209845209 | * | 12/2019 | H04R 1/02 |

OTHER PUBLICATIONS

"Written Opinion of the International Searching Authority (Form PCT/ISA/237) of PCT/CN2020/075981", mailed on Oct. 10, 2020, pp. 1-4.

* cited by examiner

LOUDSPEAKER MESH COVER AND LIGHT-EMITTING LOUDSPEAKER HAVING SAME

CROSS-REFERENCE TO RELATED APPLICATION

This application is a 371 of international application of PCT application serial no. PCT/CN2020/075981, filed on Feb. 20, 2020, which claims the priority benefit of China application no. 202020051248.1, filed on Jan. 10, 2020. The entirety of each of the above mentioned patent applications is hereby incorporated by reference herein and made a part of this specification.

TECHNICAL FIELD

The present disclosure relates to a mesh cover, in particular to a mesh cover with a light-emitting function.

BACKGROUND

As indispensable equipment in modern life and entertainment, a loudspeaker enriches audio experience in people's lives. Specifically, for office workers with fast pace of life and great work stress, listening music may help them relax and relieve stress, so as to face various difficulties of life in a better state. Meanwhile, with the increase of living standards and the closer and closer audio technology of various manufacturers in the loudspeaker industry, people also have a certain pursuit of the cool appearance of the loudspeaker. Therefore, a light-emitting loudspeaker is emerged, a loudspeaker with flash light devices around the loudspeaker has appeared on the market, and these flash light devices have the disadvantages of complex structure, inconvenient installation, great occupied space, poor overall visual comfort and poor beautiful effect. On this basis, a light-emitting structure of a light-emitting loudspeaker provided by CN201721200406.X is improved, a light-emitting assembly is arranged inside a loudspeaker, and however the light-emitting structure loudspeaker with this structure has the technical problems of single light-emitting way, occupying a certain internal space of a loudspeaker and inconvenient installation and disassembly. On the basis of the above technical defects, the present disclosure provides a loudspeaker mesh cover, which is installed outside the loudspeaker, so as to play a certain protective role on the loudspeaker, enrich the light-emitting way and save the internal space of the loudspeaker. In addition, the loudspeaker mesh cover provided by the present disclosure may transform non-light-emitting loudspeakers on the market into light-emitting loudspeakers, so as to meet the demands of consumers for loudspeakers.

SUMMARY

Technical Problem

The present disclosure aims at, in the prior art, solving the problems of single light-emitting way, occupying a certain internal space of a loudspeaker and inconvenient installation and disassembly. Therefore, the present disclosure provides a loudspeaker mesh cover, which is installed outside the loudspeaker, so as to play a certain protective role on the loudspeaker, enrich the light-emitting way and save the internal space of the loudspeaker. In addition, a light-emitting member is more convenient to disassemble in relative to a way of fixing a light-emitting assembly inside the loudspeaker. The loudspeaker mesh cover provided by the present disclosure may transform non-light-emitting loudspeakers on the market into light-emitting loudspeakers, so as to meet the demands of consumers for loudspeakers.

The present disclosure further provides a light-emitting loudspeaker with the above loudspeaker mesh cover.

The Solution to the Problem

Technical Solution

According to a first aspect, the present disclosure provides a loudspeaker mesh cover, including a mesh cover body and a light-emitting member, and the light-emitting member is arranged on the mesh cover body. In the present disclosure, the light-emitting member is arranged on the mesh cover, so as to save the internal space of the loudspeaker and play a certain protective role on the loudspeaker. In addition, the light-emitting way is greatly enriched by arranging the light-emitting member on the mesh cover, and the light-emitting member can emit light in any form at any position of the mesh cover. The loudspeaker mesh cover can transform non-light-emitting loudspeakers on the market into light-emitting loudspeakers, so as to meet the demands of consumers for loudspeakers.

Preferably, the loudspeaker mesh cover further includes a light guide material layer, which is arranged on the mesh cover body, at least a part of the light-emitting member is blocked by the light guide material layer, and light emitted by the light-emitting member penetrates through the light guide material layer. The light is refracted or scattered through the light guide material layer, so flexible light is formed, the visual comfort is higher, and the whole loudspeaker is high-end. The light guide material layer is usually transparent or semi-transparent material.

Preferably, an opening is formed in the mesh cover body, the opening is arranged at any position of the light-emitting member corresponding to the light-emitting position on the mesh cover body, and the light guide material layer is arranged on the opening. The light guide material layer is arranged on the opening, so that the surface of the loudspeaker mesh cover is more smooth and beautiful.

Preferably, the mesh cover body is provided with a first convex edge that is internally protruded from the outer surface of the mesh cover body, and the light-emitting member is arranged on a side of the first convex edge. When being arranged inside the outer surface of the mesh cover body, the light-emitting member is more beautiful than being arranged outside the outer surface of the mesh cover body, so the surface of the loudspeaker mesh cover is smooth, the convex edge provides convenience to fix the light-emitting member, and the light-emitting member may be fixed on the side of the convex edge in a manner of back adhesion.

Preferably, the first convex edge is a closed structure, and the light-emitting member is arranged on an inner side of the first convex edge. When the light-emitting member is fixed inside the closed structure, the light gathers inside the closed structure, so as to form a corresponding pattern, therefore the shape of the closed structure may be changed, so as to meet the demands of different consumers.

Preferably, a second convex edge, which is internally protruded from the outer surface of the mesh cover body, is arranged inside the first convex edge. The second convex edge may define a light-emitting position between the first convex edge and the second convex edge, forming a section of space which is smaller than the light-emitting position, enriching a light-emitting shape, and forming a corresponding pattern.

Preferably, the second convex edge is a closed structure. The light-emitting position between the first convex edge and the second convex edge may form a closed structure, which enriches a light-emitting shape and forms a corresponding pattern.

Preferably, a plurality of intervals are arranged on the second convex edge. The position and the interval areas between the first convex edge and the second convex edge may be filled with the light guide material layer through a secondary injection moulding process, the light is scattered in the light guide material layer, so that the whole area including the light guide material layer emits light, the light-emitting shape is enriched, and the corresponding pattern is formed.

Preferably, the light guide material layer is embedded on the opening or subjected to secondary injection moulding with the opening. The space utilization can be saved, and the beauty of the mesh cover structure can be effectively kept.

Preferably, the mesh cover body includes a fixed ring and a lattice mesh, and the fixed ring is arranged outside the lattice mesh. The fixed ring may be completely or partially connected to the lattice mesh, or the fixed ring may be connected to the lattice mesh through the light guide material layer.

Preferably, a plurality of screw holes are formed in the fixed ring, so that the mesh cover is fixed on the loudspeaker.

Preferably, the light-emitting member is a strip light, which is selected from one or more of a RGB light strip and an LED light strip.

Preferably, the light guide material layer is selected from one or more of silica gel, plastic, foam, EVA and EPE.

Preferably, the light guide material layer has various colors and can form a combined color with the light emitted by the light-emitting member, so that the light emitted by the mesh cover is colorful, to meet the demands of different consumers.

Preferably, the loudspeaker mesh cover further includes a control panel, which can receive a signal to control the color and sequence of the light-emitting member.

Preferably, the light-emitting member includes a strip light and a power supply module, the power supply module is connected to the strip light so as to supply electric energy, and the power supply module may be a power wire connected to a power supply or a module capable of providing electric energy separately; and the light-emitting loudspeaker is movable, so the power supply module usually selects a lithium battery.

According to the other aspect, the present disclosure provides a light-emitting loudspeaker, wherein the light-emitting loudspeaker includes a loudspeaker and a loudspeaker mesh cover provided in the first aspect of the present disclosure, and the loudspeaker mesh cover is fixed on the loudspeaker. In the present disclosure, the light-emitting member is arranged on the mesh cover, so as to save the internal space of the loudspeaker and play a certain protective role on the loudspeaker. In addition, the light-emitting way is greatly enriched by arranging the light-emitting member on the mesh cover, and the light-emitting member can emit light in any form at any position of the mesh cover. The light is refracted through the light guide material layer, so flexible light is formed, the visual comfort is higher, and the whole loudspeaker is high-end.

DETAILED DESCRIPTION OF THE EMBODIMENTS

The loudspeaker mesh cover of the embodiment of the first aspect in the present disclosure is described in details below with reference to the drawings.

Figure 1:
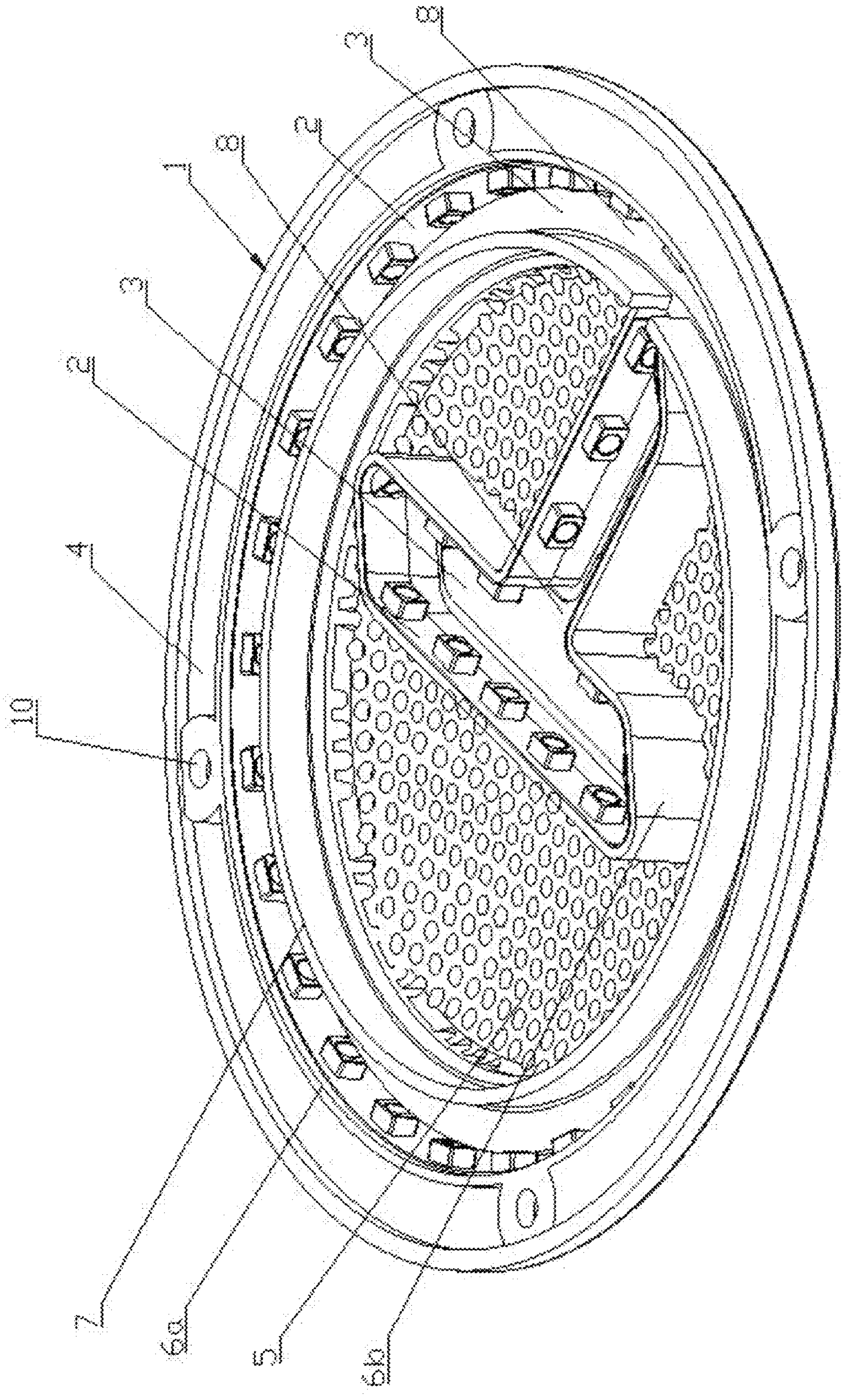
FIG. 1 is a schematic diagram of an inner side of a first loudspeaker mesh cover provided by the present disclosure.
Figure 2:
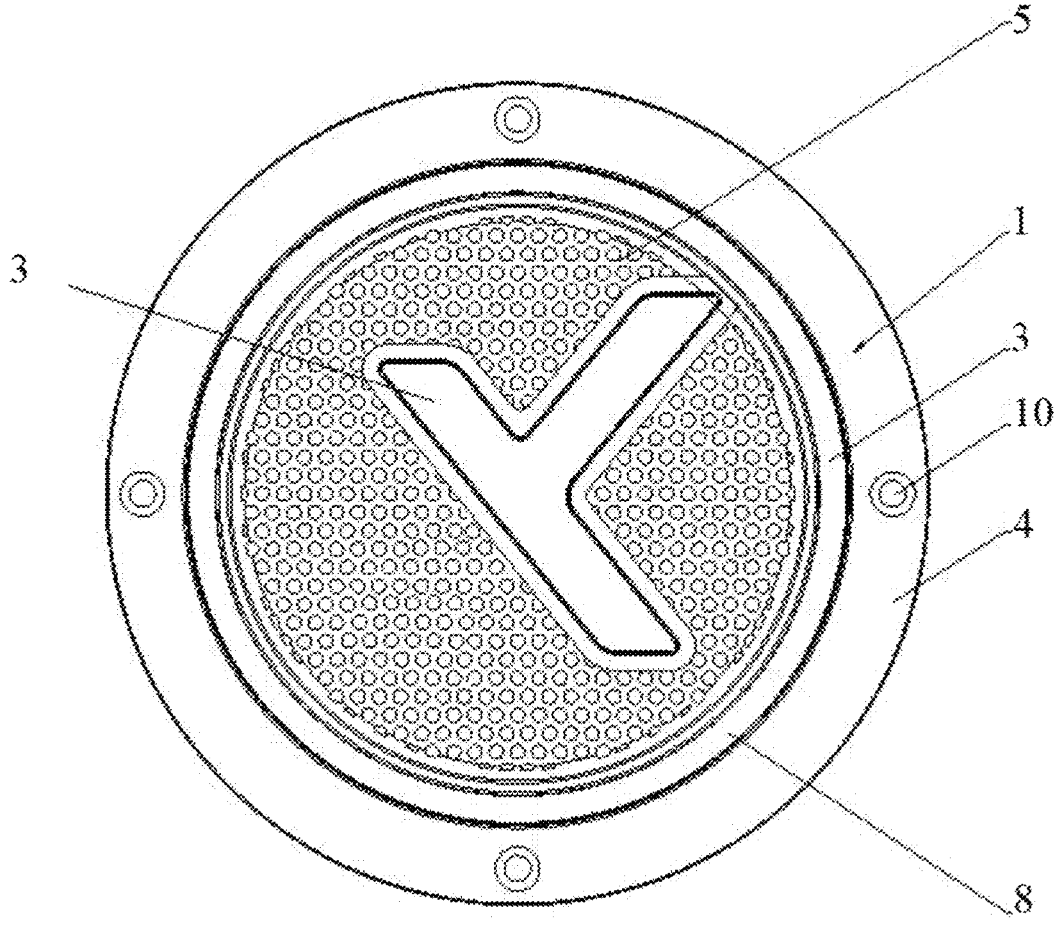
FIG. 2 is a schematic diagram of an outer side of a first loudspeaker mesh cover provided by the present disclosure.

As shown in FIG. 1 and FIG. 2, the loudspeaker mesh cover in the embodiment of the present disclosure includes a mesh cover body 1, a light-emitting member 2 and a light guide material layer 3, the mesh cover body includes a fixed ring 4 and a lattice mesh 5, the fixed ring 4 is arranged outside the lattice mesh 5, a first convex edge 6*a* that is internally protruded from the outer surface of the fixed ring 4 is arranged in an inner circumferential direction of the fixed ring 4, a second convex edge 7 that is internally protruded from the outer surface of the lattice mesh 5 is arranged in an outer circumferential direction of the lattice mesh 5, the first convex edge 6*a* and the second convex edge 7 form a closed hollow circle structure, a first convex edge 6*b* that is internally protruded from the outer surface of the lattice mesh 5 is arranged in the middle of the lattice mesh 5, the first convex edge 6*b* forms a closed hollow reversed-Y structure, the light-emitting member 2 is fixed on the inner side of the first convex edge, the first convex edge 6*b* and the second convex edge 7 are provided gaps at corresponding positions for easy installation of cables, the mesh cover body 1 is provided with an opening 8 in a corresponding closed light-emitting area, the light guide material layer 3 is embedded on the opening 8, the light is refracted through the light guide material layer 3 so as to form flexible light, and four screw holes 10 with equal intervals are arranged on the fixed ring 4, so that the loudspeaker mesh cover is fixed on the loudspeaker.

Further, the light-emitting member 2 is a strip light, which is selected from one or more of a RGB light strip and an LED light strip; the light guide material layer 3 is selected from one or more of silica gel, plastic, foam, EVA and EPE, the light guide material layer 3 has various colors and can form a combined color with the light emitted by the light-emitting member 2, so that the light emitted by the mesh cover is colorful, to meet the demands of different consumers; the light-emitting member 2 includes a strip light and a power supply module, the power supply module is connected to the strip light so as to supply electric energy, the power supply module may be a power wire connected to a power supply or a module capable of providing electric energy separately, and the light-emitting loudspeaker is movable, so the power supply module usually selects a lithium battery; and the opening 8 may be any form on the mesh cover body 1, so the opening 8 can be arranged on the fixed ring 4 or arranged on the lattice mesh 5, or arranged between the fixed ring 4 and the lattice mesh 5, so that the fixed ring 4 is partially connected to or completely separated from the lattice mesh 5.

Figure 3:
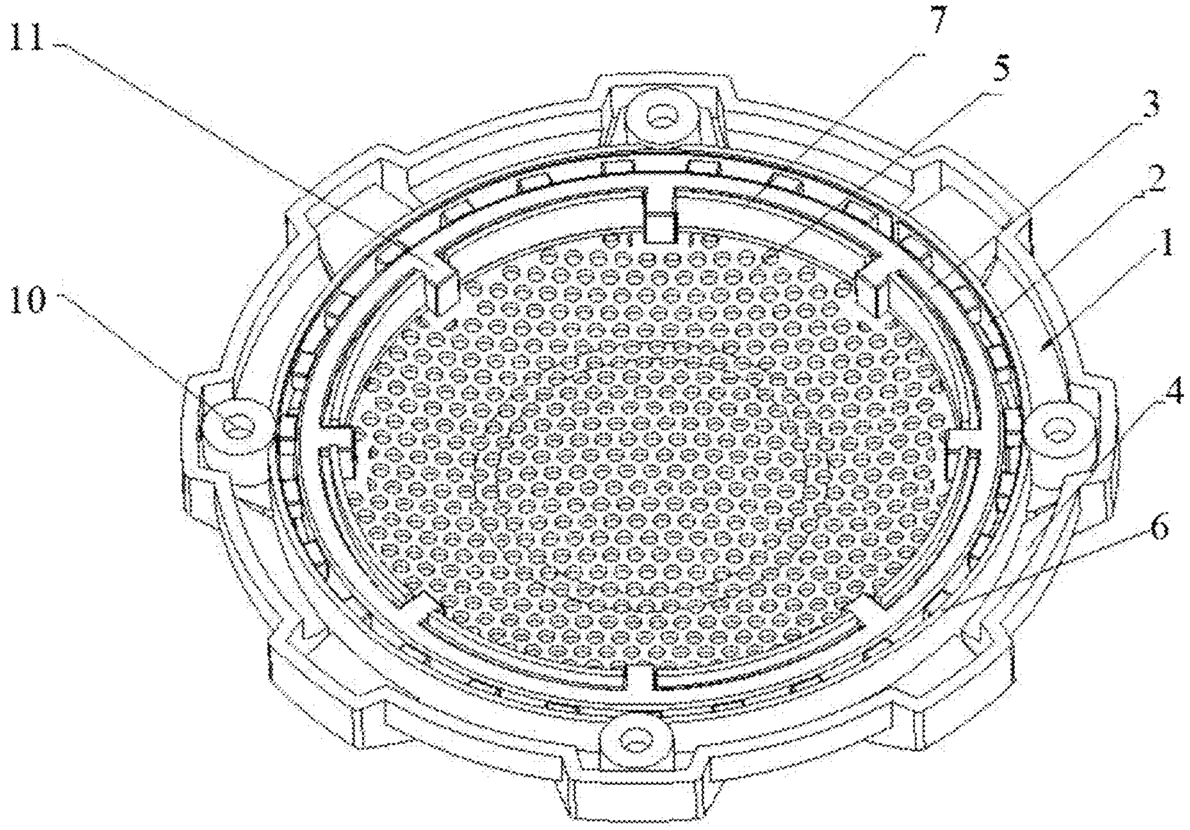
FIG. 3 is a schematic diagram of an inner side of a second loudspeaker mesh cover provided by the present disclosure.
Figure 4:
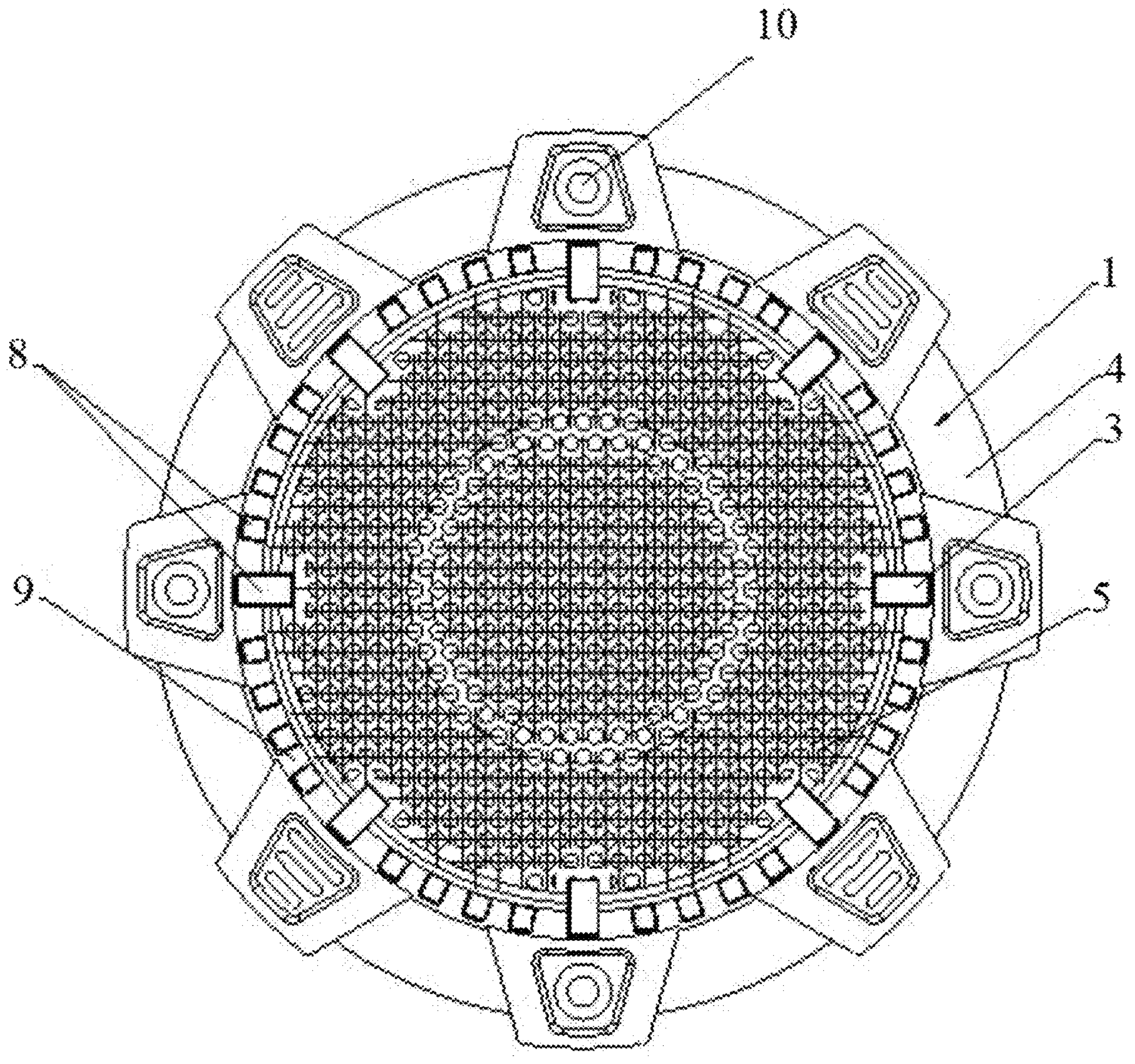
FIG. 4 is a schematic diagram of an outer side of a second loudspeaker mesh cover provided by the present disclosure.

As shown in FIG. 3 and FIG. 4, the loudspeaker mesh cover in the embodiment of the present disclosure includes a mesh cover body 1, a light-emitting member 2 and a light guide material layer 3, the mesh cover body includes a fixed ring 4 and a lattice mesh 5, the fixed ring 4 is arranged outside the lattice mesh 5, a first convex edge 6 that is internally protruded from the outer surface of the fixed ring 4 is arranged in an inner circumferential direction of the fixed ring 4, a second convex edge 7 that is internally protruded from the outer surface of the lattice mesh 5 is arranged in an outer circumferential direction of the lattice mesh 5, a plurality of intervals 11 are arranged on the second convex edge 7, the light-emitting member 2 is fixed on the inner side of the first convex edge 6, the mesh cover body 1 is provided with an opening 8 in a corresponding closed light-emitting area, a plurality of stop blocks 9 are arranged on the opening 8 so as to limit a light-emitting pattern, the light guide material layer 3 and the opening 8 are in secondary injection moulding, and the opening 8, the area between the first convex edge 6 and the second convex edge 7 and the plurality of intervals 11 on the second convex edge 7 are filled, the light is scattered through the light guide material layer 3 so as to form flexible light, and four screw holes 10 with equal intervals are arranged on the fixed ring 4, so that the loudspeaker mesh cover is fixed on the loudspeaker.

Further, the light-emitting member 2 is a strip light, which is selected from one or more of a RGB light strip and an LED light strip; the light guide material layer 3 is selected from one or more of silica gel, plastic, foam, EVA and EPE, the light guide material layer 3 has various colors and can form a combined color with the light emitted by the light-emitting member 2, so that the light emitted by the mesh cover is colorful, to meet the demands of different consumers; the light-emitting member 2 includes a strip light and a power supply module, the power supply module is connected to the strip light so as to supply electric energy, the power supply module may be a power wire connected to a power supply or a module capable of providing electric energy separately, and the light-emitting loudspeaker is movable, so the power supply module usually selects a lithium battery; and the opening 8 may be any form on the mesh cover body 1, so the opening 8 can be arranged on the fixed ring 4 or arranged on the lattice mesh 5, or arranged between the fixed ring 4 and the lattice mesh 5, so that the fixed ring 4 is partially connected to or completely separated from the lattice mesh 5.

The light-emitting loudspeaker of the embodiment of the second aspect in the present disclosure is described in details below with reference to the drawings.

Figure 5:
FIG. 5 is a schematic diagram of a light-emitting loudspeaker provided by the present disclosure.

As shown in FIG. 5, the present disclosure provides a light-emitting loudspeaker, including a loudspeaker mesh cover described in the above embodiment, a loudspeaker and a control panel, the loudspeaker mesh cover is fixed outside the loudspeaker through a screw, the loudspeaker mesh cover and the loudspeaker are connected to the control panel at the same time, so as to receive a signal to control the color and sequence of the light-emitting member, and control the loudspeaker volume.

The above embodiments only express some implementation modes of the present disclosure and are specifically described in detail and not thus understood as limits to the patent scope of the present disclosure. It is to be pointed out that those of ordinary skill in the art may further make a plurality of transformations and improvements without departing from the concept of the present disclosure and all of these falls within the scope of protection of the present disclosure. Therefore, the scope of patent protection of the present disclosure should be subject to the appended claims.

What is claimed is:

1. A loudspeaker mesh cover, comprising:
- a mesh cover body;
- a light-emitting member arranged on the mesh cover body; and
- a light guide material layer,
- wherein an opening is formed in the mesh cover body, and the light guide material layer is embedded on the opening,
- wherein the mesh cover body comprises a lattice mesh,
- wherein the mesh cover body is provided with a first convex edge that is internally protruded from an outer surface of the lattice mesh,
- wherein the first convex edge is arranged in a middle of the lattice mesh and forms a closed hollow reversed-Y structure.

2. The loudspeaker mesh cover according to claim 1, wherein at least a part of the light-emitting member is blocked by the light guide material layer, and light emitted by the light-emitting member penetrates through the light guide material layer.

3. The loudspeaker mesh cover according to claim 2, wherein the opening is arranged at any position of the light-emitting member corresponding to a light-emitting position on the mesh cover body.

4. The loudspeaker mesh cover according to claim 3, wherein the light-emitting member is arranged on a side of the first convex edge.

5. The loudspeaker mesh cover according to claim 4, wherein the light-emitting member is arranged on an inner side of the first convex edge.

6. The loudspeaker mesh cover according to claim 5, wherein a second convex edge, which is internally protruded from the outer surface of the mesh cover body, is arranged inside the first convex edge.

7. The loudspeaker mesh cover according to claim 6, wherein the second convex edge is a closed structure.

8. The loudspeaker mesh cover according to claim 7, wherein a plurality of intervals are arranged on the second convex edge.

9. The loudspeaker mesh cover according to claim 1, wherein the mesh cover body comprises a fixed ring, and the fixed ring is arranged outside the lattice mesh.

10. The loudspeaker mesh cover according to claim 9, wherein a plurality of screw holes are formed in the fixed ring.

11. A light-emitting loudspeaker, comprising a loudspeaker and the loudspeaker mesh cover according to claim 1, and the loudspeaker mesh cover is fixed on the loudspeaker.

12. The loudspeaker mesh cover according to claim 2, wherein the mesh cover body comprises a fixed ring, and the fixed ring is arranged outside the lattice mesh.

13. The loudspeaker mesh cover according to claim 3, wherein the mesh cover body comprises a fixed ring, and the fixed ring is arranged outside the lattice mesh.

14. The loudspeaker mesh cover according to claim 4, wherein the mesh cover body comprises a fixed ring, and the fixed ring is arranged outside the lattice mesh.

15. The loudspeaker mesh cover according to claim 5, wherein the mesh cover body comprises a fixed ring, and the fixed ring is arranged outside the lattice mesh.

16. The loudspeaker mesh cover according to claim 6, wherein the mesh cover body comprises a fixed ring, and the fixed ring is arranged outside the lattice mesh.

17. The loudspeaker mesh cover according to claim 7, wherein the mesh cover body comprises a fixed ring, and the fixed ring is arranged outside the lattice mesh.

18. The loudspeaker mesh cover according to claim 8, wherein the mesh cover body comprises a fixed ring, and the fixed ring is arranged outside the lattice mesh.

* * * * *